United States Patent [19]

Wilson et al.

[11] Patent Number: 5,583,842
[45] Date of Patent: Dec. 10, 1996

[54] METHOD FOR IMPROVING SERVO FIELD YIELDS

[75] Inventors: Brian D. Wilson, Boulder; Bruce D. Emo, Niwot; Patricia M. Vincent, Boulder; Wayne T. Weber, deceased, late of Boulder, all of Colo., by Clarisse Simonini-Weber, personal representative

[73] Assignee: Integral Peripherals, Inc., Boulder, Colo.

[21] Appl. No.: 115,749

[22] Filed: Sep. 1, 1993 der 37 CFR 1.47)

[51] Int. Cl.⁶ .................... G11B 7/00; G11B 5/09
[52] U.S. Cl. .................... 369/54; 369/58; 360/48
[58] Field of Search .................... 369/54, 58, 48, 369/50, 44.26, 32, 47; 360/48, 53, 51

[56] References Cited

U.S. PATENT DOCUMENTS

| | | | |
|---|---|---|---|
| 4,669,004 | 5/1987 | Moon et al. | 369/48 |
| 4,833,665 | 5/1989 | Tokumitsu et al. | 360/53 |
| 4,858,034 | 8/1989 | Hassel et al. | 360/51 |
| 4,920,528 | 4/1990 | Sakamoto et al. | 369/54 |
| 4,984,230 | 1/1991 | Satoh et al. | 369/54 |
| 5,075,804 | 12/1991 | Deyring | 369/54 |
| 5,216,655 | 6/1993 | Hearn et al. | 369/58 |
| 5,235,585 | 8/1993 | Bish et al. | 369/54 |
| 5,237,553 | 8/1993 | Fukushima et al. | 369/54 |
| 5,310,627 | 6/1994 | Shinno et al. | 369/58 |
| 5,319,627 | 6/1994 | Shinno et al. | 369/48 |
| 5,384,668 | 1/1995 | Shih et al. | 360/53 |

FOREIGN PATENT DOCUMENTS

60-185258  9/1985  Japan.

Primary Examiner—Nabil Hindi

[57] ABSTRACT

A novel method is used to remap tracks on a disk that contain a defect in a servo field so that a large seek discontinuity is not encountered. The method is applicable to both Class 2 and Class 3 defects. When a track with a Class 2 defect or adjacent tracks with a Class 3 defect are encountered, the tracks are skipped over in assigning physical track numbers to absolute track numbers. When a first defective track is encountered, the next track without a defect is assigned the physical track number that would have been assigned to the first defective track. As the remapping operation continues, each subsequent track with a Class 2 defect or adjacent tracks with a Class 3 defect is handled in a similar manner. The remapping operation is terminated when the number of mapped tracks is equal to the desired number of physical tracks n.

7 Claims, 7 Drawing Sheets

| track X−1 | 0 | 1 | 2 | 3 | 4 | 5 | 6 | 7 | 8 | 9 |
|---|---|---|---|---|---|---|---|---|---|---|
| track X | 0 | 1 | 2 | 3 | 4 | 5 | 6 | 7 | 8 | 9 |

*FIG. 8A*

(Prior Art)

| track X−1 | 0 | 1 | 2 | 3 | 4 | 5 | 6 | 7 | 8 | 9 |
|---|---|---|---|---|---|---|---|---|---|---|
| track X | 6 | 7 | 8 | 9 | 0 | 1 | 2 | 3 | 4 | 5 |

*FIG. 8B*

(Prior Art)

| track X−4 | 0 | 1 | 2 | 3 | 4 | 5 | 6 | 7 | 8 | 9 |
|---|---|---|---|---|---|---|---|---|---|---|
| track X−3 | 6 | 7 | 8 | 9 | 0 | 1 | 2 | 3 | 4 | 5 |
| track X−2 | 2 | 3 | 4 | 5 | 6 | 7 | 8 | 9 | 0 | 1 |
| track X−1 | 8 | 9 | 0 | 1 | 2 | 3 | 4 | 5 | 6 | 7 |
| defective | − | − | − | − | − | − | − | − | − | − |
| defective | − | − | − | − | − | − | − | − | − | − |
| track X | 3 | 4 | 5 | 6 | 7 | 8 | 9* | 0 | 1 | 2 |
| track X+1 | 9 | 0 | 1 | 2 | 3 | 4 | 5 | 6 | 7 | 8 |
| track X+2 | 5 | 6 | 7 | 8 | 9 | 0 | 1 | 2 | 3 | 4 |

METHOD FOR IMPROVING SERVO FIELD YIELDS

BACKGROUND OF THE INVENTION

1. Field of the Invention

This invention relates generally to methods for formatting disks and in particular to a method of remapping a defective disk for embedded servo operation that enhances yields and eliminates spurious seeks to auxiliary tracks.

2. Description of Related Art

Typically, a disk drive contains one or more circular planar disks that are coated on each side with a magnetic medium. The disk or disks are mounted on a spindle that extends through the center of each disk so that the disks may be rotated at a predetermined speed, usually about 3600 rpm. Typically, one read/write head is associated with each side of the disk that is coated with a magnetic medium. The read/write head flies a small distance above the disk surface as the disk rotates. The read/write head, in response to signals from electronics associated with the disk drive, writes data at a predetermined location in the magnetic medium. Similarly, the read/write head, in response to other signals from the disk drive electronics, reads the data stored at a predetermined location.

The configuration of the data on the magnetic surface is instrumental in the operation of the disk drive. Data are recorded by the read/write head in concentric circular tracks on the disk. Typically, each track is segmented into one or more parts that are referred to as sectors. Thus, the disk drive must move the read/write head radially across the disk surface to locate the track for reading or writing data and then must follow that track circumferentially until the desired sector passes under the read/write head. Hence, the read/write head is positioned at a predetermined radial and circumferential position over the disk surface.

In a disk drive, each read/write head is usually affixed by an arm to an actuator. In a closed-loop disk drive, a servo system is used to move the actuator. Many different servo systems have been developed for use in hard disk drives. In an embedded servo system, a servo pattern contained in a servo field at the start of each sector was used to determine the radial and circumferential position of the read/write head relative to the disk. The servo information that was read by the read/write head was provided to the disk drive control loop electronics which in turn generated signals to reposition the read/write head as necessary based on that servo information. The servo pattern also typically contained synchronization signals for the disk drive electronics.

The data in the servo field was pre-recorded on the disk and the disk drive electronics were designed to prevent writing user data over the servo field data. Since the pre-recorded data in the servo fields were used to position the read/write heads and for synchronization, all the information in each servo field had to be free of defects. Unfortunately, the manufacturing process used to place the magnetic coating on the disk often fails to produce a defect free surface. Therefore, there is a likelihood that when the servo field data is recorded on the disk, a defect occurs in the location of one or more of the servo fields.

Defects in pre-recorded servo field information are typically grouped into three classes:

Class 1: Minor defects that are either temporary or permanent where the servo information is corrupted but the track containing the corrupted servo information is usable;

Class 2: Intermediate defects that affect a single track and are permanent where the servo information is corrupted and the single track is not usable; and Class 3: Large defects that are permanent and extend radially across more than one track where the servo information is corrupted and the tracks with the corrupted servo are not usable.

Figure 1:
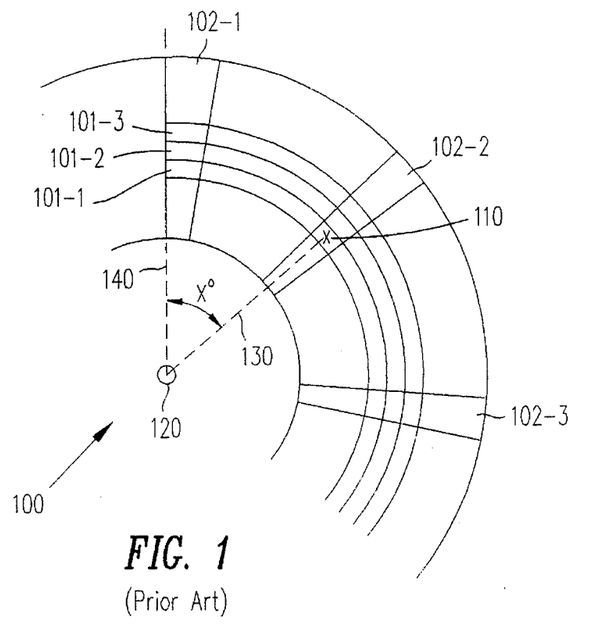
FIG. 1 is an illustration of a portion of a prior art disk with a single defect in one servo field.

FIG. 1 is a representation of a disk 100 that includes concentric circular tracks 101-1, 101-2, 101-3. Regions 102-1, 102-2, 102-3 are embedded servo fields that each contain servo data. Each region 102-1, 102-2, and 102-3 contain n servo fields, i.e., one servo field in each of the n concentric data tracks on the disk. Those skilled in the art will appreciate that FIG. 1 is only a partial representation of disk 100, and that this partial representation is sufficient to adequately represent the general features of disk 100.

As illustrated in FIG. 1, region 102-2 has a defect 110 in track 101-1. Centerline 130 of region 102-2 is oriented at angle x° from line 140, which coincides with the leading edge of region 102-1, where centerline 130 and line 140 intersect at center 120 of disk 100.

If defect 110 was a Class 1 defect, prior art methods typically used cyclic redundancy codes to correct such defects in the data fields. Therefore, if defect 110 was moved into the data region, the track containing the defect would still be usable. Class 1 defects in the servo field were corrected typically using hardware information recovery techniques, such as similar rereads.

Figure 2:
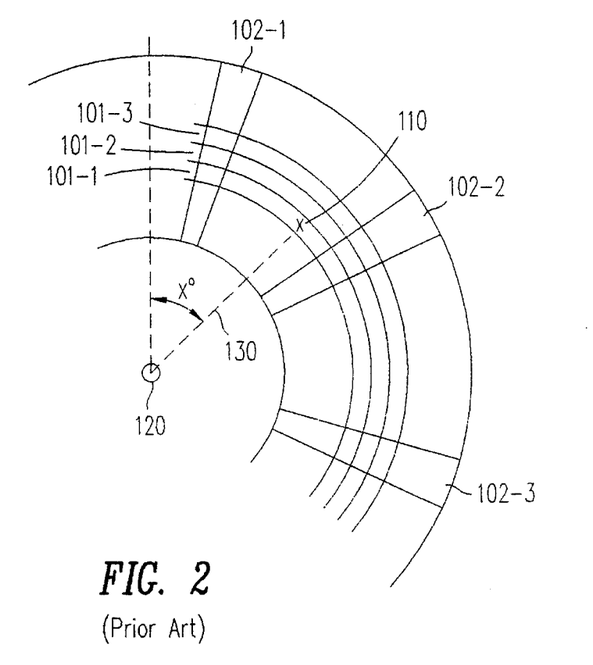
FIG. 2 is an illustration of the portion of the prior art disk of FIG. 1 after the servo field regions are angularly rotated.

If defect 110 was a Class 2 defect, defect 110 was typically handled by repositioning the servo field in which defect 110 occurred. In one method, regions 102-1, 102-2, and 102-3 were angularly repositioned. For example, in FIG. 2, the pre-recorded servo information in regions 102-1, 102-2, and 102-3 has been angularly rotated so that defect 110 is no longer contained in region 102-2.

The angular rotation method is usually effective if the distribution of defects is random and the absolute quantity of defects is small as is the case in disk drives with a low areal density, i.e., disk drives with a low information capacity.

Figure 3:
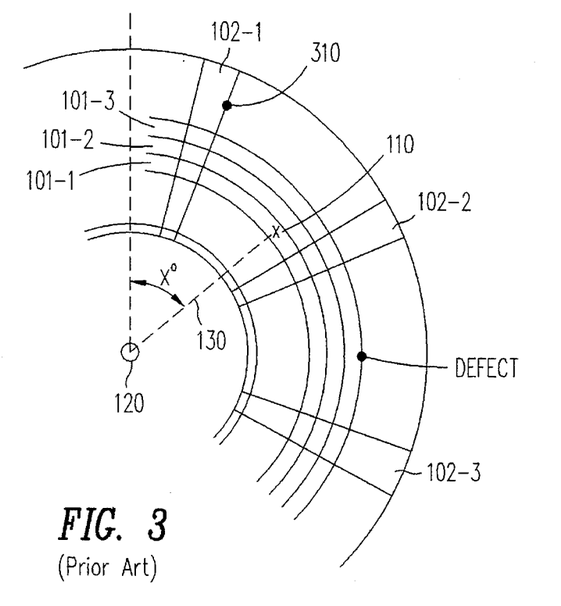
FIG. 3 is an illustration of the portion of the prior art disk of FIG. 1 with multiple defects after the servo field regions are angularly rotated and another defect is found in another servo field.

However, if the absolute quantity of defects is not small, there is a good likelihood that after angular rotation, another defect is contained in one of the servo field regions. For example, in FIG. 3, after angular rotation for Class 2 defect 110, defect 310 is located in region 102-1. Moreover, with increased recording density more sector fields per track are employed and narrower tracks are utilized. The result is that a greater number of sector field defects are discovered.

A second prior art strategy to cope with sector field defects was to utilize auxiliary tracks located adjacent to the crash stop zones. The auxiliary tracks were used for utility and diagnostic purposes and a small number of auxiliary tracks were available to map as replacements for tracks with permanent defects in sector information fields.

Figure 4:
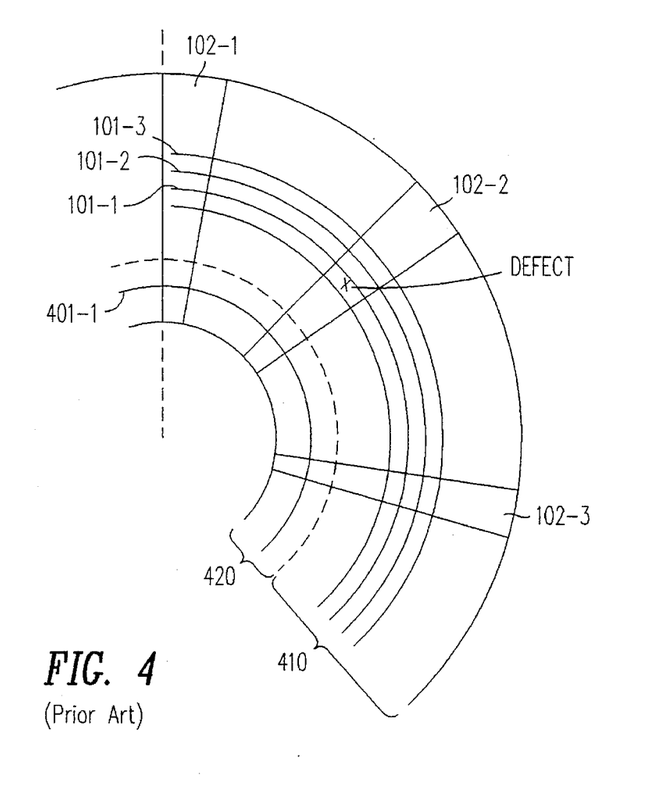
FIG. 4 is an illustration of a portion of a prior art disk with a defect in one servo field and the remapping of the track containing the defect to a utility area of the disk.

In FIG. 4, tracks in zone 410 are used for data storage. Track 101-1 has defect 110 in region 102-2. In the second prior art method, track 101-1 is mapped to track 401-1 in zone 420. Unfortunately, the quantity of tracks in zone 420 is limited and is determined by the crash stop physical tolerances.

Further, using replacement tracks, such as track 401-1, in zone 420 requires additional undesirable seek operations and latency delays which act to reduce disk drive performance. For example, in a sequence that accesses in order tracks 101-3, 101-1, and 101-2, track 101-3 is located in a first seek. Normally, the second seek would be a two track seek. However, defect 110 caused track 101-1 to be remapped to track 401-1. Thus, a longer seek is required, i.e., a seek from track 101-3 to track 401-1 instead of a seek from track 101-3 to track 101-1. Similarly, the seek from track 101-1 to track 101-2 would have been a single track seek, but now the seek is from track 401-1 to track 101-2. Hence, the remapping of track 101-1 to track 401-1 introduces two large seek discontinuities in accessing data that are expected to be in adjacent tracks.

The above prior art methods were utilized primarily for Classes 1 and 2 defects only. A Class 3 defect is a previously unaddressed problem affecting miniature disk drives utilizing high areal densities, i.e., those that use high linear recording densities, e.g., densities in the range of 25,000 bits per inch (BPI) or more simultaneously with high track density, e.g., 2000 track per inch (TPI) and higher. In these miniature disk drives, the tracks are so narrow and so close together that a single physical defect can simultaneously affect a number of radially adjacent tracks. The high linear recording densities increase the probability of discovering even more defects.

As the number of defects increases, the prior art methods for compensating for the defects will probably be ineffective. Therefore, the disk drive must be disassembled and the defective disk replaced with another disk. Disassembly and repair is expensive. Therefore, a better method for handling disk defects is needed for increased areal recording density and, in particular, for miniature disk drives.

SUMMARY OF THE INVENTION

According to the principles of this invention, when a defect in a servo field requires remapping a disk, the disk drive stores the absolute track number of each defective track. For each seek, the stored defective absolute track numbers are used to adjust, i.e., map, the physical target track number to the correct absolute track number so that at the end of the seek the transceiver is positioned over the appropriate track. This mapping allows determination of the absolute target track in a seamless way and avoids spurious seeks to auxiliary tracks that were required by prior art methods.

The method of this invention is used for a disk having one or more tracks with a defect. The method includes the steps of:

generating a list containing an entry for each absolute track number containing a defect wherein each entry is the absolute track number; and adjusting a seek length to a target track number by increasing the seek length by one track for each entry in the list that has an absolute track number greater than or equal to the target track number.

In one embodiment the step of adjusting the seek length includes:

a) checking the list to determine whether there is an entry in the list to process;

b) positioning a transducer upon step a) determining that there is not an entry left to process;

c) retrieving an absolute track number entry from the list upon step a) determining there is an entry left in the list to process;

d) comparing the target track number with the retrieved absolute track number entry;

e) adding one to the target track number upon step d) determining that the target track number is equal to or greater than the retrieved absolute track number entry;

f) branching to step a) upon completion of step e); and g) branching to step a) upon step d) determining that the target track number is less than the retrieved absolute track number entry.

Hence, the method adjusts the target track number to the correct absolute track number and the size of the seek is increased only by the number of defective tracks that are flown over in the seek.

According to the principles of this invention, defective tracks on a disk are simply skipped over so that the large seek discontinuities of the prior art remapping method are eliminated. Moreover, the novel method of this invention is applicable to both Class 2 and Class 3 defects.

In one embodiment of the method of this invention, when a track with a Class 2 defect or adjacent tracks with a Class 3 defect are encountered, the defective track or tracks are skipped over in assigning physical track numbers to absolute track numbers. Specifically, when a first defective track is encountered, the next track without a defect is assigned the physical track number that would have been assigned to the first defective track. As the remapping operation continues, each subsequent track with a Class 2 defect or adjacent tracks with a Class 3 defect are handled in a similar manner. The remapping operation is terminated when the number of mapped tracks is equal to the desired number of physical tracks n.

DETAILED DESCRIPTION

According to the principles of this invention, a novel method is used to remap tracks on a disk that contain a defect in a servo field so that the large seek discontinuities of the prior art remapping method, described above, are eliminated. Moreover, the novel method of this invention is applicable to both Class 2 and Class 3 defects, as defined above.

In the method of this invention, when a track with a Class 2 defect or adjacent tracks with a Class 3 defect are encountered, the defective track or tracks are skipped over in assigning physical track numbers to absolute track numbers. When a first defective track is encountered, the next track without a defect is assigned the physical track number that would have been assigned to the first defective track. As the remapping operation continues, each subsequent track with a Class 2 defect or adjacent tracks with a Class 3 defect are handled in a similar manner. The remapping operation is terminated when the number of mapped tracks is equal to the desired number of physical tracks n.

Herein, "absolute track number" refers to the track number obtained by assigning a first track number to the track at one radial extreme of the disk and then sequentially numbering each track in the disk along the radial dimension of the disk until the last track at the other radial extreme of the disk is reached. Thus, absolute track numbers are assigned to both defective and non-defective tracks. The physical track number refers to the track number used to access data on the disk. Hence, generally only tracks without defects are assigned physical track numbers. As is known to those skilled in the art, in a seek, the physical track number is mapped to an absolute track number and the absolute track number is used to position the transducer.

When a defect in a servo field requires remapping a disk according to the principles of this invention, the disk drive stores the absolute track number of each defective track. For each seek, the stored defective absolute track numbers are used to adjust, i.e., map the target track number so that the transceiver is positioned over the appropriate track. This mapping allows determination of the absolute target track in a seamless way and avoids spurious seeks to auxiliary tracks that were required by the prior art method described above.

Figure 5A:
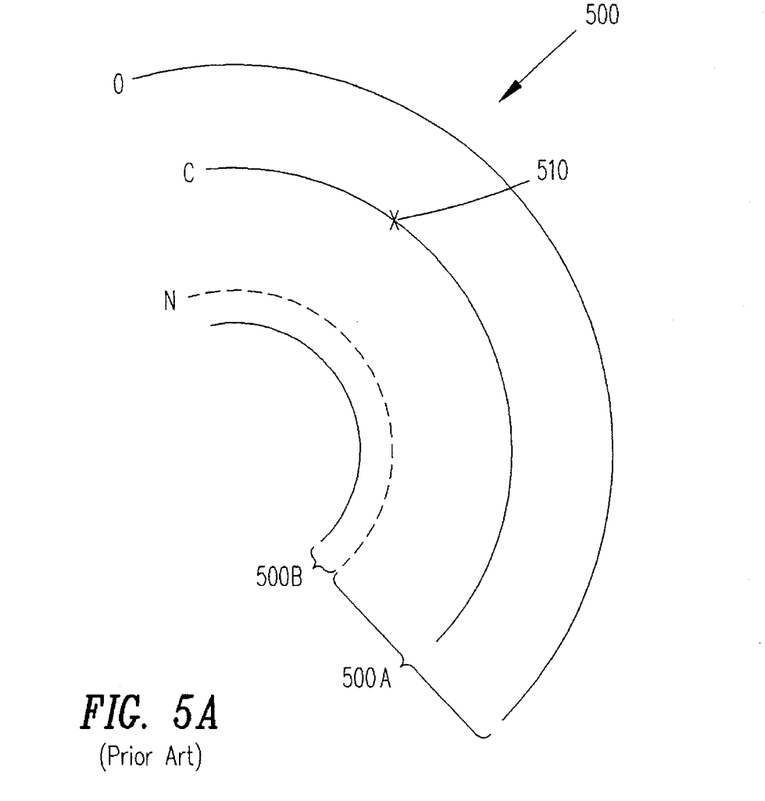
FIG. 5A is an illustration of a portion of a prior art disk with a defect in a servo field of track C.
Figure 5B:
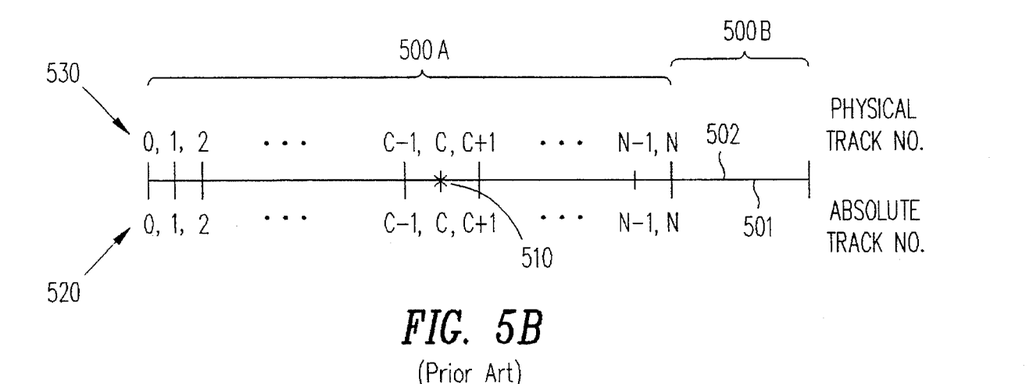
FIG. 5B is a cross-sectional view of the disk in FIG. 5A with physical and absolute track numbers prior to reformatting of the disk to compensate for the error in the servo field of track C.

The principles of this invention are demonstrated by considering specific examples of the implementation of the invention. Disk 500 (FIG. 5A) has a data region 500A that includes N+1 tracks with absolute track numbers 0 to N, respectively, and a utility region 500B that is used for internal functions such as diagnostics. Absolute track number C has a defect 510 that falls within a servo field. FIG. 5B is a cross-sectional representation of the disk where absolute track numbers 520 are shown along bottom 501 of disk 500 and physical track numbers 530 prior to application of the method of this invention are shown along top 502 of disk 500.

Figure 5C:
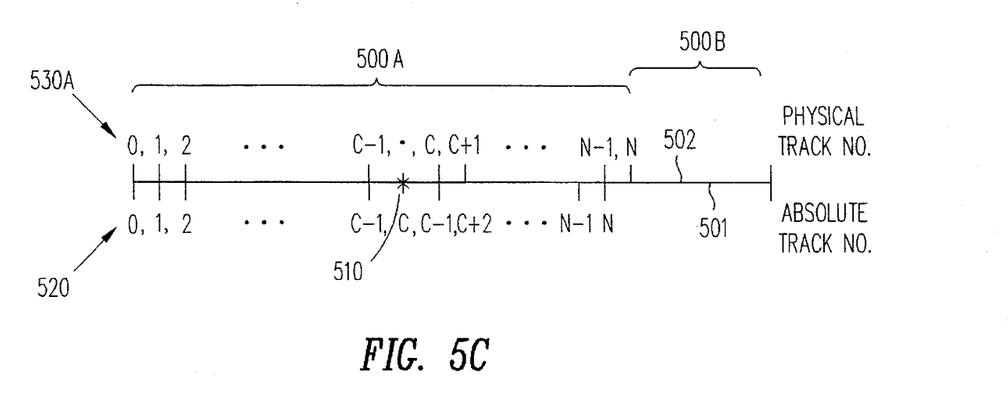
FIG. 5C is a cross-sectional view of the disk in FIG. 5A after the disk is remapped according to the principles of the invention.

When defect 510 is detected in absolute track number C, disk 500 is remapped using the principles of this invention so that physical track numbers 530A are as shown along top 502 of disk 500 in FIG. 5C. There is a one-to-one correspondence between absolute track numbers 0 to (C–1) and physical track number 0 to (C–1). Since absolute track number C contains a defect, absolute track number C is not used. Consequently, physical track number C is assigned to absolute track number (C+1), i.e., physical track number C is simply mapped to the next absolute track number that does not have a defect. Consequently, physical track number (C+1) is assigned to absolute track number (C+2) and so forth. Physical track number N is now the first track in utility region 500B.

The sequential access of physical tracks number (C–1), C, and (C+1) requires only a single altered seek resulting in movement of the transducer from absolute track number (C–1) to absolute track number (C+1) and then to absolute track number (C+2). The advantage of the method of this invention is readily apparent by comparing FIG. 5C with the cross-sectional representation of the prior art method in FIG. 6.

Figure 6:
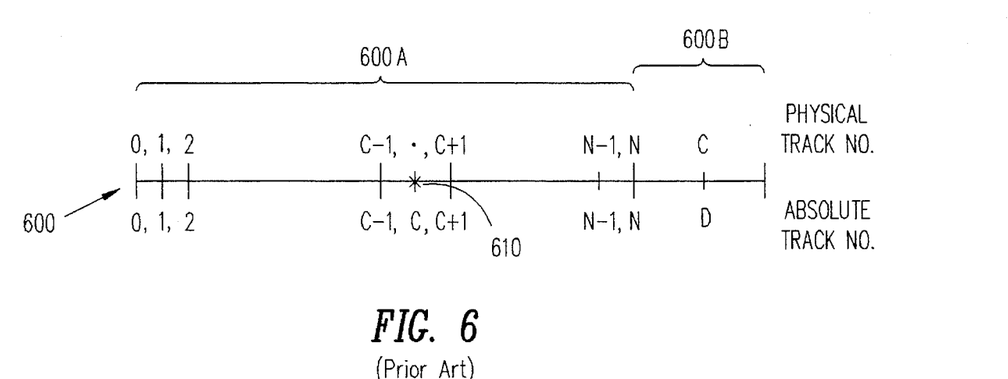
FIG. 6 is a cross-sectional view of a disk equivalent to that illustrated in FIG. 5A after the disk is remapped using a prior art method.

In FIG. 6, initially, disk 600 is substantially identical to disk 500 and defect 610 is in physical track C. However, unlike the method of this invention as illustrated in FIG. 5C, physical track C is mapped to absolute track number D in utility region 600B of disk 600 and the other physical track numbers remain unchanged. The sequential access of physical tracks number (C–1), C, and (C+1) on disk 600 requires a seek from absolute track number (C–1) to absolute track number D and then a second seek from absolute track number D to absolute track number (C+1). Hence, in contrast to the single altered seek for the configuration of FIG. 5C, two altered seeks are required and both of the altered seeks are large. Consequently, the seek performance of a drive that is formatted as shown in FIG. 5C is superior to the same drive that is formatted as shown in FIG. 6.

Figure 7A:
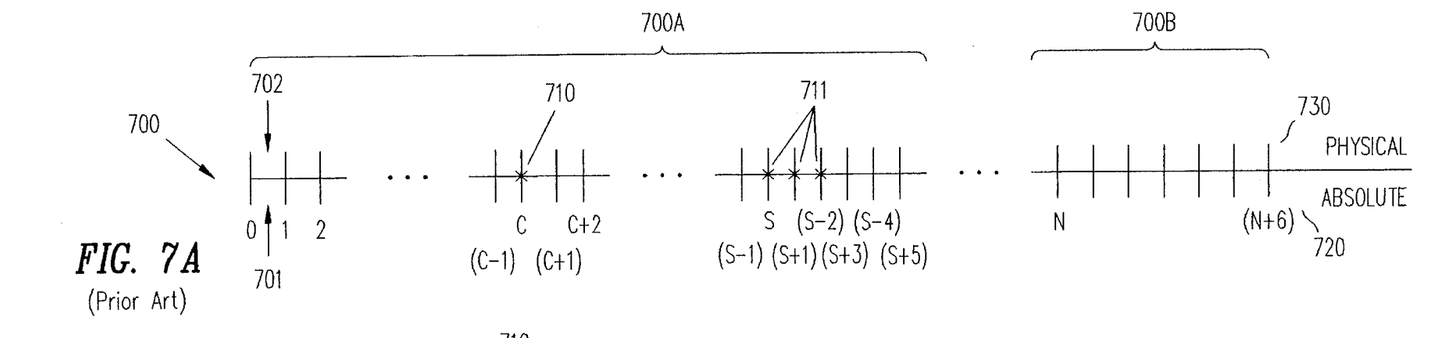
FIG. 7A is a cross-sectional view of a prior art disk with a defect in one track and another defect in several adjacent tracks.

The advantages of this invention are even greater when the disk contains multiple defects. A radial cross section of disk 700 (FIG. 7A) shows that disk 700 has a Class 2 defect 710 in absolute track number C and a Class 3 defect 711 that affects absolute track numbers S, (S+1), and (S+2) in data portion 700A, and has a utility region 700B at the outer circumference of disk 700. The numbers along bottom 701 of disk 700 are absolute track numbers 720.

Figure 7B:
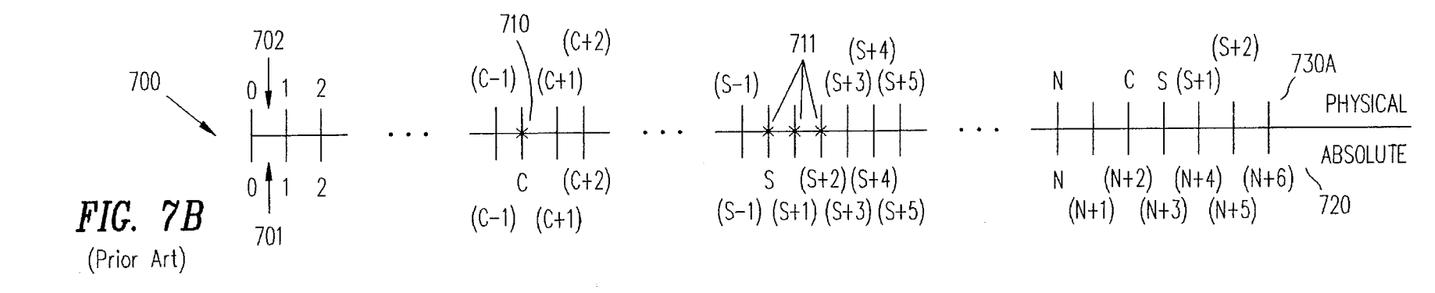
FIG. 7B is a cross-sectional view of the disk in FIG. 7A, after the tracks with defects are remapped to the utility area of the disk using the prior art method.

In FIG. 7B, disk 700 is remapped using the principles of the prior art method described above. As indicated above, Class 3 defects were generally not treated by the prior art remapping method. Thus, the remapping shown in FIG. 7B is illustrative only. Specifically, physical track number C and physical track numbers S, (S+1), and (S+2) are remapped to utility region 700B. Specifically, physical track number C is remapped to absolute track number (N+2). Physical track numbers S, (S+1), and (S+2) are remapped to absolute track number (N+3) to (N+5), respectively. For convenience, the remapped tracks are taken as being adjacent.

Thus, for a seek for physical track number C requires a seek to absolute track (N+2) as described above. Similarly, a seek for any one of physical track numbers S, S+1, or S+2 would require a longer seek to the appropriate track in utility region 700B. The time required for each long seek to and from utility region 700B significantly affects the seek performance of the disk drive. Thus, the prior art method is not suitable for miniature high performance disk drives.

Figure 7C:
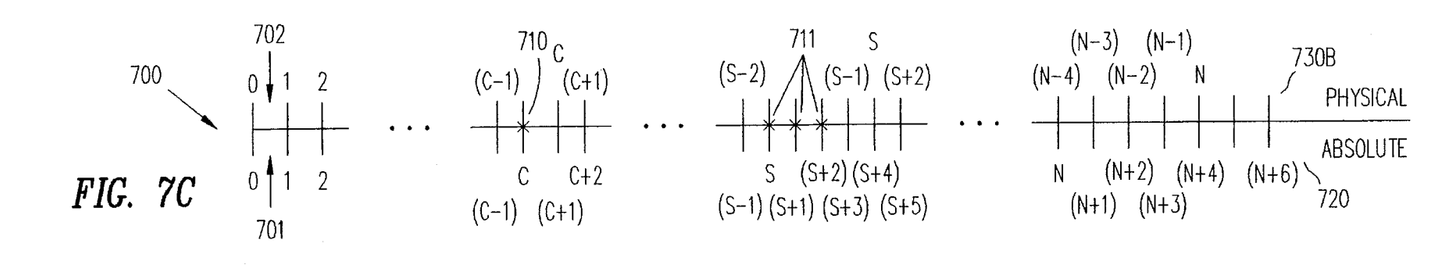
FIG. 7C is a cross-sectional view of the disk in FIG. 7A after the disk is remapped according to the principles of the invention so that only a single altered seek is required to compensate for each defective track.

In contrast, according to the principles of this invention, only two altered short seeks are required to compensate for defects 710 and 711 in disk 700 and so the disk drive seek performance is not significantly affected by the Class 3 defect. Specifically, as shown in FIG. 7C, according to the principles of this invention, physical track number C is remapped to absolute track number C+i and each of the subsequent physical track numbers are offset by one from the absolute track number until absolute track number S is reached. Since absolute track numbers S, (S+1), and (S+2) are defective, absolute track number (S+3) is remapped to physical track number (S−1) and each of the subsequent physical track numbers are offset by four from the corresponding absolute track number.

Since four defective tracks are present, four adjacent tracks are used in utility region 700B. With this remapped disk, the long seeks of the prior art method between the defective area in data region 700A and utility region 700B are eliminated. Instead for each defective region, where a region is one or more tracks, the altered seek is only from the track just prior to the first defective track to the next good track on the disk and not from the track just prior to the first defective track to the utility region and then back to the next track in the data region.

An important aspect of this invention is adjusting the "skew" from track to track as defective tracks are skipped. As is known to those skilled in the art, when data sectors are sequentially accessed across many tracks, the best disk drive performance is achieved by maintaining the highest possible data transfer rate. Since a certain amount of time is required to reposition the transducer from one track to the next, the earliest possible time for resumption of data transfer is some number of data sectors after the sector in the original track. If the second track is oriented so that sector number zero is shifted relative to sector number zero in the original track by the time delay required to move the transducer from one track to the next, data transfer can be resumed as soon as repositioning is complete. The distance that sector number zero is shifted from one track to the next is referred to as "skew." In formatting a disk, this skew is applied between all adjacent tracks.

As described above, physical track addressing, according to the principles of this invention, sequentially numbers all useable tracks and skips over defective tracks. Since skew is useful only in the data transfer process, skew is applied during the physical track mapping process.

Specifically, when physical track number X is slipped to compensate for a defect, physical track number X is no longer physically adjacent to physical track number (X−1). Hence, the repositioning time from physical track number (X−1) to physical track number X is increased. If the additional repositioning time introduced by slipping physical track number X is significant compared to the length of a data sector, as explained more completely below, the skew for the track to track seek from physical track number (X−1) to physical track X needs to be adjusted. Failure to adjust the skew for the longer seek time between these tracks may cause the target sector in the physical track number X to be missed and so the seek time is increased by the time required for about a revolution of the disk.

To illustrate the adjustment of the skew as physical track numbers are slipped, consider a disk drive having the parameters given in Table 1.

TABLE 1

| Time per disk revolution | 20 milliseconds (ms) |
|---|---|
| Sectors per track | 40 |
| Track-to-track seek time | 5 ms plus 0.2 ms for each additional track |

For this disk drive, the global skew is:

$$\text{Global skew} = (5 \text{ ms}/20 \text{ ms}) \times 40 \text{ sectors per track}$$
$$= 1/4 \times 40 = 10 \text{ sectors skew}$$

To determine the skew when physical track number X is slipped three tracks from physical track number (X−1), i.e., three defective tracks are discovered, the skew is calculated in the same way as the global skew except the three additional tracks are included. Specifically, $$\text{Skew for } (X-1) \text{ to } X = ((5 \text{ ms} + 3 \times 0.2 \text{ ms})/20 \text{ ms}) \times 40$$
$$= 11 \text{ sectors skew}$$

Figure 8A:
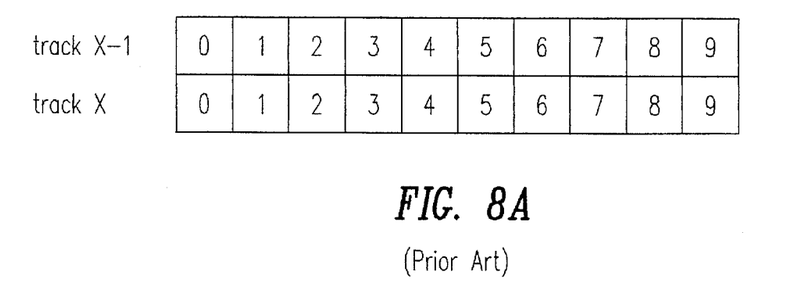
FIG. 8A illustrates a prior art disk with no sector skew from track-to-track.
Figure 8B:
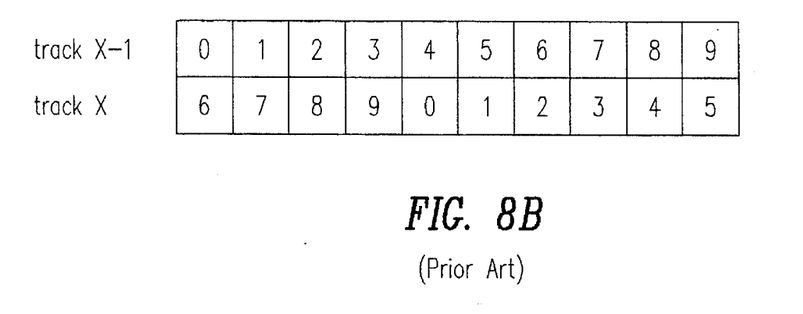
FIG. 8B illustrates a disk with no defects and sector skew from track-to-track.
Figure 8C:
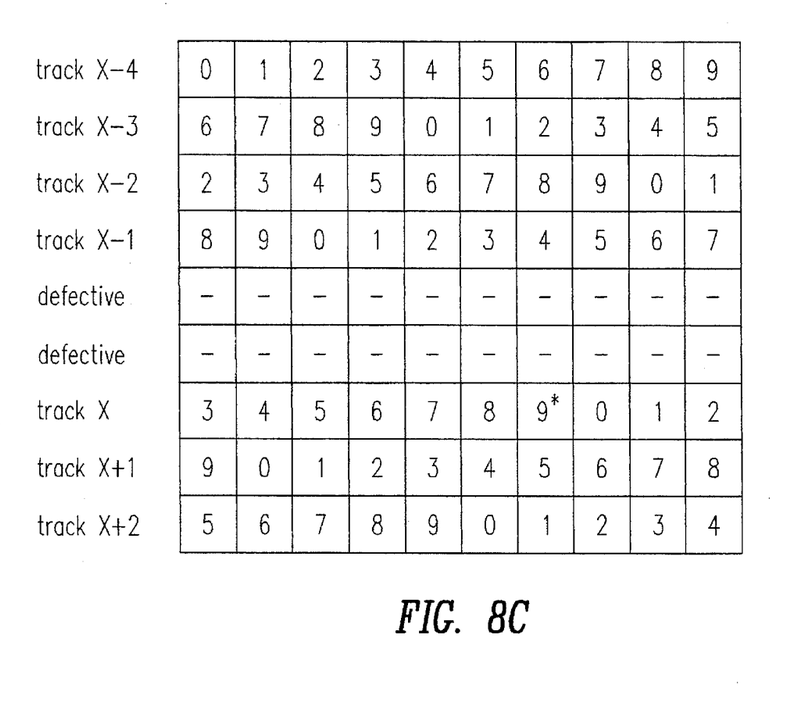
FIG. 8C illustrates a disk with defects where physical track numbers are slipped and the sector skew is adjusted to compensate for the number of tracks slipped.

FIGS. 8A to 8C are another graphical example. The disk drive used for FIGS. 8A to 8C has ten sectors per track and a four sector global skew. In FIG. 8A, there is no skew from physical track number (X−1) to physical track number X. Thus, in a seek from sector 3 in track (X−1) to sector 4 in track X, sector 8 in track X is under the transducer when the repositioning is complete. Therefore, data transmission can not begin until sector 4 in track X moves under the transducer.

In FIG. 8B, the skew has been applied between physical track number (X−1) and physical track number X. Thus, sector zero in track X is offset from sector zero in track (X−1) by four sectors. Hence, in a seek from sector 3 in track (X−1) to sector 4 in track X, sector 4 in track X is under the transducer when repositioning is complete. Thus, data transmission begins as soon as possible after the seek is completed. Consequently slipping of physical track X by two tracks does not introduce any additional rotational latency.

In FIG. 8C, physical track number X has been slipped two tracks because the two tracks are defective. When the skew is calculated, the skew is five sectors. Thus, there are five sectors between sector zero of track (X−1) and track X. This local adjustment of the skew assumes that in a seek from track (X−1) to track X, data transmission can begin as soon as the repositioning is complete.

Figure 9:
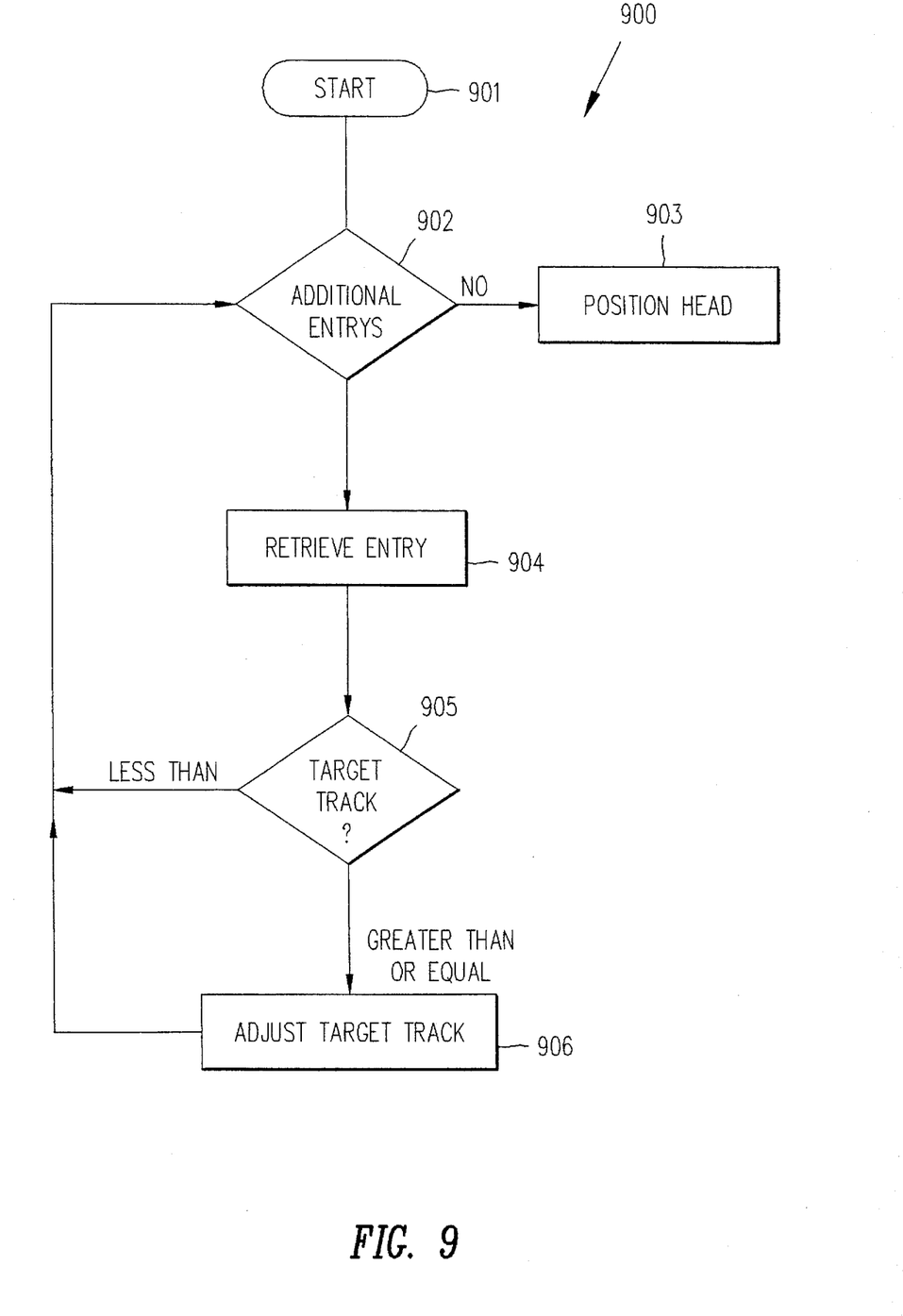
FIG. 9 is a process flow diagram for accessing information in a disk that has been remapped according to the principles of this invention.

The method of this invention may be implemented in a variety of ways. In one embodiment, process 900, illustrated in FIG. 9, is implemented using the microprocessor or data signal processor, hereinafter microprocessor, that controls the seek operation. In this embodiment, a table, i.e., a list, is maintained in a non-volatile memory that contains the absolute track number of each defective track. Preferably, the value of the absolute track number(s) of the defective track(s) are ordered monotonically in the table.

The actual location of the table during disk drive operation is not critical. For example, the table could be addressed in a read-only memory, or upon start-up of the disk drive, the table could be loaded from a non-volatile memory, e.g. the disk itself, or a flash EEPROM, into a dynamic random-access memory that is used by the microprocessor. Those skilled in the art will appreciate that the access speed for retrieving the absolute track numbers stored in the table depends upon the type of memory utilized and so they can choose an appropriate memory based on, for example, cost, available memory, and speed performance of the memory. In one embodiment, the table is loaded into the dynamic random access memory used by the microprocessor.

Process 900 starts at step 901 when a target track number is provided, i.e., a physical track number. The target track number is determined in the standard way as is well known to those skilled in the art. In additional entries check step 902, the table of defective track numbers is examined to determine whether any entries remain to be processed. If there are no defective tracks on the disk, the table of defective track numbers is empty and so process 900 passes through step 902 to position head step 903. Position head step 903 is equivalent to the prior art process for positioning the transducer over the target track and so is well-known to those skilled in the art.

However, if the table of defective track numbers includes one or more entries, additional entries check step 902 passes processing to retrieve entry step 904 which retrieves the next entry in the table, which in this case is the first entry. When an entry is retrieved, a pointer is moved down the list. Target track check step 905 compares the target track number with the value of the defective track number retrieved from the table.

If the target track number is less than the retrieved defective track number, step 905 transfers to step 902. Conversely, if the target track number is greater than or equal to the retrieved defective track number, processing transfers to adjust target track step 906.

If the process reaches adjust target track step 906, a defective track exists within the range of the seek that has been skipped over, as described above. Accordingly, the target track number is adjusted so that the target track corresponds to the location of the data in view of the adjustment of the physical track numbers. Hence, in this embodiment of adjust target track step 906, the target track number is incremented by one. Processing transfers from step 906 to step 902. Process 900 continues until each entry in the table of defective tracks has been processed.

The simple process of consecutively numbering the good tracks on the disk with physical track numbers and maintaining a list of defective track in terms of absolute track numbers makes it possible with process 900 to accommodate both Class 2 and Class 3 errors without any significant impairment of the seek time. Consequently, the process of this invention significantly improves servo field yields. Therefore, the need to disassemble disk drives with defective disks is significantly reduced which in turn improves the yield of disk drives.

The embodiments of the invention described above are illustrative only and so are not intended to limit the invention to the particular embodiments described. In view of this disclosure, those skilled in the art can achieve the improved results of this invention in a variety of ways.

We claim:

1. A method for mapping physical track numbers to concentric tracks on a disk having a defect in track (m+1) comprising the steps of:

formatting said concentric tracks consecutively in a radial direction of said disk from absolute track number 0 to absolute track number x wherein track (m+1) is absolute track number (m+1) and is located between said absolute track number 0 and absolute track number x;

mapping physical track numbers 0 to m to absolute track numbers 0 to m respectively;

skipping absolute track number (m+1) which contains said defect by not assigning a physical track number to absolute track number (m+1); ;and mapping physical track number (m+1) to absolute track number (m+2) wherein only a single altered seek from physical track number m to physical track number m+1 is required in avoiding the defect in absolute track number (m+1).

2. A method for mapping physical track numbers to concentric tracks on a disk having a defect in tracks (m+1) and (m+2) comprising the steps of:

formatting said concentric tracks consecutively in a radial direction of said disk from absolute track number 0 to absolute track number x wherein track (m+1) is absolute track number (m+1); track (m+2) is absolute track number (m+2); and tracks (m+1) and (m+2) are located between absolute track number 0 and absolute track number x;

mapping physical track numbers 0 to m to absolute track numbers 0 to m respectively;

skipping absolute track numbers (m+1) and (m+2) which contain said defects by not assigning a physical track number to absolute track numbers (m+1) and (m+2); and mapping physical track number (m+1) to absolute track number (m+3) wherein only a single altered seek from physical track number m to physical track number (m+1) is required in avoiding the defects in absolute track numbers (m+1) and (m+2).

3. A method for mapping physical track numbers to concentric tracks, herein after "tracks," on a disk where one or more of the tracks include a defect, said method comprising:

a) sequentially assigning a physical track number to each of the tracks until a defective track is found;

b) skipping said defective track and any other defective tracks physically adjacent to said defective track by not assigning a physical track number to the defective track or tracks; and c) assigning a physical track number to the first track following said defective track or tracks.

4. The method of claim 3 wherein step c) further comprising assigning a physical track number to each track following the first track following said defective track or tracks until yet another defective track is found.

5. The method of claim 4 further comprising step d) of returning to step b) when said yet another defective track is found in step c.

6. The method of claim 5 further comprising repeating steps b), c), and d) until all physical track numbers are mapped.

7. The method of claim 3 wherein said step c) includes assigning a skew to said first track following said defective track or tracks.

\* \* \* \* \*